(12) United States Patent
Takamura

(10) Patent No.: US 7,250,460 B1  
(45) Date of Patent: *Jul. 31, 2007

(54) INORGANIC-ORGANIC POLYMER NANOCOMPOSITE AND METHODS FOR MAKING AND USING

(75) Inventor: Koichi Takamura, Charlotte, NC (US)

(73) Assignee: BASF AG, Ludwigshafen Rheinland-Pfalz (DE)

( * ) Notice: Subject to any disclaimer, the term of this patent is extended or adjusted under 35 U.S.C. 154(b) by 287 days.

This patent is subject to a terminal disclaimer.

(21) Appl. No.: 10/828,457

(22) Filed: Apr. 20, 2004

Related U.S. Application Data (63) Continuation-in-part of application No. 10/332,894, filed as application No. PCT/US02/33343 on Jun. 18, 2002, now Pat. No. 6,855,754, application No. 10/828,457, which is a continuation-in-part of application No. PCT/US01/44988, filed on Nov. 20, 2001, which is a continuation of application No. 09/790,273, filed on Feb. 21, 2001.

(60) Provisional application No. 60/256,709, filed on Dec. 18, 2000.

(51) Int. Cl.
C08K 3/16 (2006.01)
C08K 3/28 (2006.01)
C08K 3/30 (2006.01)

(52) U.S. Cl. .......................... 524/423; 524/429; 524/80

(58) Field of Classification Search ................ 524/405, 524/417, 423–424, 429, 394, 456, 80
See application file for complete search history.

(56) References Cited

U.S. PATENT DOCUMENTS

| | | | |
|---|---|---|---|
| 3,220,953 A | 11/1965 | Borgfeldt et al. | |
| 3,236,671 A | 2/1966 | Dybalaski et al. | |
| 3,466,247 A | 9/1969 | Ohtsuka et al. | |
| 3,660,324 A | 5/1972 | Ohtsuka et al. | |
| 3,695,152 A | 10/1972 | Graf | |
| 3,951,676 A | 4/1976 | Elste, Jr. | |
| 3,959,204 A * | 5/1976 | Dunn | 524/425 |
| 4,251,416 A * | 2/1981 | Palmer | 524/423 |
| 4,296,207 A | 10/1981 | Siegmund | |
| 4,456,534 A * | 6/1984 | Lambert et al. | 210/725 |
| 4,462,840 A | 7/1984 | Schilling et al. | |
| 4,597,799 A | 7/1986 | Schilling | |
| 4,772,648 A | 9/1988 | Demangeon et al. | |
| 4,921,892 A | 5/1990 | Moore et al. | |
| 4,944,804 A | 7/1990 | Schilling | |
| 5,160,453 A | 11/1992 | Schilling | |
| 5,268,029 A | 12/1993 | Demangeon et al. | |
| 5,443,632 A | 8/1995 | Schilling | |
| 5,667,718 A | 9/1997 | Jones et al. | |
| 5,843,222 A | 12/1998 | Miller et al. | |
| 6,000,876 A | 12/1999 | Shen et al. | |

FOREIGN PATENT DOCUMENTS

| | | |
|---|---|---|
| GB | 2 151 640 | 7/1985 |
| RU | 2071491 * | 1/1997 |
| WO | WO 02/024759 | 3/2002 |
| WO | WO03/000760 | 1/2003 |

OTHER PUBLICATIONS

English Copy of International Search Report for PCT/US 02/33343 filed Jun. 18, 2002.
Takamura, Koichi, SBR Syntheic Latex in Paving Application, Bitumen Asia 2000, June 20-21, Singapore.
Brown, SF., A Study of Cement Modified Bitumen Emulsion Mixtures, pp. 92-121 Mar. 15, 2000.
Wyoming Department of Transportation, Special Provision for Micro Surfacing, Nov. 18, 1998.

* cited by examiner

*Primary Examiner*—Peter Szekely (57) ABSTRACT

A method of forming a composition comprising adding at least one first compound that is at least one of an alkali metal salt, an ammonium salt, an alkali metal hydroxide, or an ammonium hydroxide and at least one second compound that is at least one of a Group IIA salt, a Group IIIA salt, a Group IIIB salt, a copper salt, a zinc salt, a cadmium salt, a manganese salt, an iron salt, a cobalt salt, or a nickel salt to a latex. This method allows for the formation of nanoparticles in the composition.

10 Claims, 6 Drawing Sheets

INORGANIC-ORGANIC POLYMER NANOCOMPOSITE AND METHODS FOR MAKING AND USING

CROSS-REFERENCE TO RELATED APPLICATIONS

This application is a continuation-in-part of U.S. Ser. No. 10/332,894, filed 14 Jan. 2003, which is a national stage application of A. International Application No. PCT/US02/33343, which was filed on 18 Jun. 2002, which is a continuation-in-part of International Application No. PCT/US01/44988, which was filed on 20 Nov. 2001 (Nov. 20, 2001), which claims priority to U.S. Ser. No. 09/790,273, filed on 21 Feb. 2001 (Feb. 21, 2001), and to U.S. Ser. No. 60/256,709, filed on 18 Dec. 2000 (Dec. 18, 2000), and B. International Application No. PCT/US01/44988, which was filed on 20 Nov. 2001 (Nov. 20, 2001), which claims priority to U.S. Ser. No. 09/790,273, filed on 21 Feb. 2001 (Feb. 21, 2001), and to U.S. Ser. No. 60/256,709, filed on 18 Dec. 2000 (Dec. 18, 2000), all of which are incorporated herein by reference.

BACKGROUND OF THE INVENTION

Inorganic particles and/or clays have typically been incorporated into polymeric compositions during the polymerization of the polymer. This forms a nanocomposite composition. This method may be difficult to accomplish. It would be desirable to have a method of forming nanocomposite compositions without the difficulty of addition of the nanoparticles during polymerization.

SUMMARY OF THE INVENTION

The invention relates to a method of forming a composition comprising adding at least one first compound that is at least one of an alkali metal salt, an ammonium salt, an alkali metal hydroxide, or an ammonium hydroxide and at least one second compound that is at least one of a Group IIA salt, a Group IIIA salt, a Group IIIB salt, a copper salt, a zinc salt, a cadmium salt, a manganese salt, an iron salt, a cobalt salt, or a nickel salt to a latex.

BRIEF DESCRIPTION OF THE DRAWINGS

FIGS. 6 (a) and (b) are graphs of tensile strength vs. elongation for the latex films heat aged for 20 minutes (a) and 40 minutes (b) in a forced airflow oven at 160° C.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention includes a composition formed by mixing a polymer latex, at least one first compound selected from the group consisting of alkali metal salts, ammonium salts, alkali metal hydroxides, and ammonium hydroxide; and at least one second compound preferably selected from the group consisting of Group IIA, Group IIIA, Group IIIB, copper, zinc, cadmium, manganese, iron, cobalt and nickel salts. By combining alkali metal or ammonium salts or hydroxides in solution, and one or more salts such as a Group IIA, Group IIIA, Group IIIB, copper, zinc, cadmium, manganese, iron, cobalt or nickel salts in solution, a composition is formed that contains fine inorganic crystals. When the latex is dried, a latex polymer nanocomposite is formed. The polymer nanocomposite has improved mechanical and heat aging properties as compared to the polymer without the inorganic particles.

The latex can be any latex. The latex is prepared before the addition of the first or second compound. Suitable polymer latices include, but are not limited to, cationic SBR (styrene-butadiene rubber) latices, natural rubber latices, polychloroprene latices (e.g. NEOPRENE® latices available from E.I. Du Pont de Nemours), carboxylated (polystyrene-butadiene) latices, and acrylic latices. The list of various latices can be found in "Polymer Dispersions and Their Industrial Applications" ed. by D. Urban and K. Takamura, Wiley-VCH, 2002. These latices used for this invention should maintain their dispersion stability during the process. Preferably, a cationic SBR latex is used. The cationic SBR latex emulsion typically includes between about 0.1 and about 10%, and more preferably, between about 2% and about 6% by weight cationic surfactants. The latex used for this invention should remain as a stable dispersion by the addition of aqueous solutions of the second compounds. Suitable cationic SBR latices include BUTONAL® NX1118 and BUTONAL® NS 198, commercially available from BASF Corporation.

The present composition is prepared by mixing at least one compound selected from the group consisting of alkali metal salts, alkali metal hydroxides, ammonium salts, and ammonium hydroxide in the composition. The alkali metal and ammonium salts and hydroxides are preferably added to the composition in aqueous solution in an amount from greater than 0 to about 4 parts by weight, more preferably, from about 0.005 to about 3 parts by weight (based on the weight of the salt or hydroxide and not the salt or hydroxide solution). Because the alkali metal and ammonium salts and hydroxides added to the composition are added in aqueous solution, the salts and hydroxide of the invention are water-soluble and preferably have a solubility in water at 20° C. of greater than about 10 g/100 mL. The salts for use in the invention include but are not limited to sulfates, carbonates, silicates, phosphates, phosphites, borates, fluorides, sulfites, oxalates and citrates. Suitable alkali metal and ammonium salts and hydroxides for use in the invention include but are not limited to sodium hydroxide (NaOH), sodium sulfate ($Na_2SO_4$), sodium bisulfate ($NaHSO_4$), sodium carbonate ($Na_2CO_3$), sodium bicarbonate ($NaHCO_3$), sodium metasilicate ($Na_2SiO_3$), sodium disilicate ($Na_2Si_2O_5$), sodium orthosilicate ($Na_4SiO_4$), sodium orthophosphate ($Na_3PO_4$), disodium hydrogen phosphate ($Na_2HPO_4$), sodium dihydrogen phosphate ($NaH_2PO_4$), hexasodium metaphosphate (($NaPO_3)_6$), trisodium metaphosphate (($NaPO_3)_3$), sodium triphosphate ($Na_5P_3O_{10}$), sodium hypophosphite ($NaH_2PO_2$), sodium dihydrogen orthophosphite ($NaH_2PO_3$), sodium metaborate ($NaBO_2$), sodium sulfite ($Na_2SO_3$), sodium citrate ($Na_3C_6H_5O_7$), potassium hydroxide (KOH), potassium sulfate ($K_2SO_4$), potassium bisulfate ($KHSO_4$), potassium carbonate ($K_2CO_3$), potassium bicarbonate ($KHCO_3$), potassium sodium carbonate ($KNaCO_2$), potassium metasilicate ($K_2SiO_3$), potassium tetrasilicate ($K_2Si_4O_9$), potassium orthophosphate ($K_3PO_4$), dipotassium hydrogen phosphate ($K_2HPO_4$), potassium dihydrogen phosphate ($KH_2PO_4$), hexapotassium metaphosphate (($KPO_3)_6$), tetrapotassium metaphosphate (($KPO_3)_4$), potassium pyrophosphate ($K_4P_2O_7$), potassium subphosphate ($K_2PO_3$), potassium hypophosphite ($KH_2PO_2$), potassium dihydrogen orthophosphite ($KH_2PO_3$), potassium metaborate ($KBO_2$), potassium tetraborate ($K_2B_4O_7$), potassium fluoride (KF), potassium sulfite ($K_2SO_3$), potassium hydrogen sulfite ($KHSO_3$), potassium citrate ($K_3C_6H_5O_7$), monobasic potassium citrate ($KH_2C_6H_5O_7$), ammonium hydroxide ($NH_4OH$), ammonium sulfate (($NH_4)_2SO_4$), ammonium bisulfate ($NH_4HSO_4$), ammonium carbonate (($NH_4)_2CO_3$), ammonium bicarbonate ($NH_4HCO_3$), ammonium orthophosphate (($NH_4)_3PO_4$), diammonium hydrogen phosphate (($NH_4)_2HPO_4$), ammonium dihydrogen phosphate ($NH_4H_2PO_4$), ammonium sodium phosphate ($NaNH_4HPO_4$), ammonium hypophosphite ($NH_4H_2PO_2$), ammonium dihydrogen orthophosphite ($NH_4H_2PO_3$), ammonium fluoride ($NH_4F$), ammonium sulfite (($NH_4)_2SO_3$), ammonium bisulfite ($NH_4HSO_3$), ammonium binoxalate ($NH_4HC_2O_4$), diammonium citrate (($NH_4)_2HC_6H_5O_7$) and triammonium citrate (($NH_4)_3C_6H_5O_7$). Preferably, the alkali metal and ammonium salts and hydroxides are salts and hydroxides of sodium, potassium and ammonium and, more preferably, are hydroxides, sulfates, carbonates, silicates and phosphates of sodium, potassium and ammonium. In a preferred embodiment, the alkali metal and ammonium salts and hydroxides include sodium hydroxide. The alkali metal and ammonium salts and hydroxides can be provided in hydrated or anhydrous form for use in the invention.

The alkali metal and ammonium salts and hydroxides provide cations that react with the Group IIA, Group IIIA, Group IIIB, copper, zinc, cadmium, manganese, iron, cobalt and nickel salts preferably used in the invention as discussed below. Preferably, the alkali metal and ammonium salts and hydroxides are provided in stoichiometric excess with respect to these Group IIA, Group IIIA, Group IIIB, copper, zinc, cadmium, manganese, iron, cobalt and nickel salts. In addition, a sufficient amount of the alkali metal and ammonium salts and hydroxides are generally included to increase the pH of the overall composition to a pH of at least about 9. If an alkali metal or ammonium salt is used that cannot produce the desired pH in solution such as the salt of a strong acid and strong base (e.g. sodium sulfate), at least one alkali metal or ammonium salt or hydroxide that provides alkalinity to the composition, i.e., a base such as sodium hydroxide or the salt of a weak acid and strong base such as sodium carbonate, is preferably additionally included to provide the desired pH.

At least one compound preferably selected from the group consisting of Group IIA (e.g. Be, Mg, Ca, Sr, Ba), Group IIIA (e.g. Sc, La), Group IIIB (e.g. Al, Ga, In), copper, zinc, cadmium, manganese, iron, cobalt and nickel salts is also added to the composition. In addition, water-soluble salts having other cations can be used in accordance with the invention that react with the alkali metal and ammonium salts and hydroxides to produce a salt or hydroxide having a solubility in water at 20° C. of less than about 0.5 g/100 mL. The Group IIA, Group IIIA, Group IIIB, copper, zinc, cadmium, manganese, iron, cobalt and nickel salts are preferably added to the composition in aqueous solution in an amount from greater than 0 to about 2 parts by weight, more preferably, in an amount from about 0.001 to about 1 part by weight (based on the weight of the salt). Preferably, the Group IIA, Group IIIA, Group IIIB, copper, zinc, cadmium, manganese, iron, cobalt and nickel salts added to the composition of the invention are water-soluble and preferably have a solubility in water at 20° C. of greater than about 10 g/100 mL. For example, the Group IIA, Group IIIA, Group IIIB, copper, zinc, cadmium, manganese, iron, cobalt and nickel salts can be chlorides, sulfates or nitrates. Suitable Group IIA, Group IIIA, Group IIIB, copper, zinc, cadmium, manganese, iron, cobalt and nickel salts include but are not limited to calcium chloride ($CaCl_2$), calcium nitrate ($Ca(NO_3)_2$), magnesium chloride ($MgCl_2$), magnesium nitrate ($Mg(NO_3)_2$), magnesium sulfate ($MgSO_4$), aluminum chloride ($AlCl_3$), aluminum nitrate ($Al(NO_3)_3$), aluminum sulfate ($Al_2(SO_4)_3$), beryllium chloride ($BeCl_2$), beryllium nitrate ($Be(NO_3)_2$), beryllium sulfate ($BeSO_4$), copper (II) chloride ($CuCl_2$), copper (II) nitrate ($Cu(NO_3)_2$), copper (II) sulfate ($CuSO_4$), strontium chloride ($SrCl_2$), strontium nitrate ($Sr(NO_3)_2$), barium chloride ($BaCl_2$), barium nitrate ($Ba(NO_3)_2$), zinc chloride ($ZnCl_2$), zinc nitrate ($Zn(NO_3)_2$), zinc sulfate ($ZnSO_4$), cadmium chloride ($CdCl_2$), cadmium nitrate ($Cd(NO_3)_2$), cadmium sulfate ($CdSO_4$), scandium chloride ($ScCl_3$), scandium nitrate ($Sc(NO_3)_3$), scandium sulfate ($Sc_2(SO_4)_3$), gallium chloride ($GaCl_3$), gallium nitrate ($Ga(NO_3)_3$), gallium sulfate ($Ga_2(SO_4)_3$), indium chloride ($InCl_3$), indium nitrate ($In(NO_3)_3$), indium sulfate ($In_2(SO_4)_3$), lanthanum chloride ($LaCl_3$), lanthanum nitrate ($La(NO_3)_3$), manganese (II) chloride ($MnCl_2$), manganese (II) nitrate ($Mn(NO_3)_2$), manganese (II) sulfate ($MnSO_4$), iron (II) chloride ($FeCl_2$), iron (II) nitrate ($Fe(NO_3)_2$), iron (II) sulfate ($FeSO_4$), iron (III) chloride ($FeCl_3$), iron (III) nitrate ($Fe(NO_3)_3$), iron (III) sulfate ($Fe_2(SO_4)_3$), cobalt (II) chloride ($CoCl_2$), cobalt (II) nitrate ($Co(NO_3)_2$), cobalt (II) sulfate ($CoSO_4$), cobalt (III) chloride ($CoCl_3$), nickel chloride ($NiCl_2$), nickel nitrate ($Ni(NO_3)_2$), and nickel sulfate ($NiSO_4$). Preferably, the Group IIA, Group IIIA, Group IIIB, copper, zinc, cadmium, manganese, iron, cobalt and nickel salts are calcium, magnesium or aluminum salts such as calcium chloride ($CaCl_2$), calcium nitrate ($Ca(NO_3)_2$), magnesium chloride ($MgCl_2$), magnesium nitrate ($Mg(NO_3)_2$), magnesium sulfate ($MgSO_4$), aluminum chloride ($AlCl_3$), aluminum nitrate ($Al(NO_3)_3$), and aluminum sulfate ($Al_2(SO_4)_3$). More preferably, the Group IIA, Group IIIA, Group IIIB, copper, zinc, cadmium, manganese, iron, cobalt and nickel salts include calcium chloride or calcium nitrate. The Group IIA, Group IIIA, Group IIIB, copper, zinc, cadmium, manganese, iron, cobalt and nickel salts can be provided in hydrated or anhydrous form.

The alkali metal and ammonium salts and hydroxides added to the composition react with the Group IIA, Group IIIA, Group IIIB, copper, zinc, cadmium, manganese, iron, cobalt and nickel salts added to the composition to produce at least one Group IIA, Group IIIA, Group IIIB, copper, zinc, cadmium, manganese, iron, cobalt or nickel salt or hydroxide having a low solubility in water (if any). Preferably, the Group IIA, Group IIIA, Group IIIB, copper, zinc, cadmium, manganese, iron, cobalt and nickel salts or hydroxides produced by the reaction have a solubility in water at 20° C. of less than about 0.5 g/100 mL. For example, the Group IIA, Group IIIA, Group IIIB, copper, zinc, cadmium, manganese, iron, cobalt and nickel salts and hydroxides produced by the reaction of the salts added to the composition include but are not limited to calcium hydroxide ($Ca(OH)_2$), calcium sulfate ($CaSO_4$), calcium carbonate ($CaCO_3$), calcium metasilicate ($CaSiO_3$), calcium orthosilicate ($Ca_2SiO_4$), tricalcium silicate ($3CaO\ SiO_2$), calcium orthophosphate ($Ca_3(PO_4)_2$), dicalcium orthophosphate ($CaHPO_4$), monocalcium orthophosphate ($Ca(H_2PO_4)_2$), calcium hypophosphate ($Ca_2P_2O_6$), calcium metaphosphate ($Ca(PO_3)_2$), calcium pyrophosphate ($Ca_2P_2O_7$), calcium orthophosphite ($CaHPO_3$), calcium tetraborate ($CaB_4O_7$), calcium metaborate ($Ca(BO_2)_2$), calcium fluoride ($CaF_2$), calcium sulfite ($CaSO_3$), calcium oxalate ($CaC_2O_4$), calcium citrate ($Ca_3(C_6H_5O_7)_2$), aluminum hydroxide ($Al(OH)_3$), aluminum silicate ($Al_2O_3 SiO_2$ or $3Al_2O_3\ 2SiO_2$), aluminum orthophosphate ($AlPO_4$), aluminum fluoride ($AlF_3$), aluminum oxalate ($Al_2(C_2O_4)_3$), magnesium hydroxide ($Mg(OH)_2$), magnesium carbonate ($MgCO_3$), magnesium metasilicate ($MgSiO_3$), magnesium orthosilicate ($Mg_2SiO_4$), magnesium orthophosphate ($Mg_3(PO_4)_2$), magnesium monohydrogen orthophosphate ($MgHPO_4$), magnesium pyrophosphate ($Mg_2P_2O_7$), magnesium orthophosphite ($MgHPO_3$), magnesium metaborate ($Mg(BO_2)_2$), magnesium orthoborate ($Mg_3(BO_2)_2$), magnesium fluoride ($MgF_2$), magnesium oxalate ($MgC_2O_4$), beryllium hydroxide ($Be(OH)_2$), beryllium carbonate ($BeCO_3$), beryllium orthosilicate ($Be_2SiO_4$), copper (II) hydroxide ($Cu(OH)_2$), copper (II) carbonate ($CuCO_3$), copper (II) orthophosphate ($Cu_3(PO_4)_2$), copper (I) fluoride ($CuF$), copper (II) oxalate ($CuC_2O_4$), copper citrate ($Cu_2C_6H_4O_7$), strontium hydroxide ($Sr(OH)_2$), strontium sulfate ($SrSO_4$), strontium carbonate ($SrCO_3$), strontium metosilicate ($SrSiO_2$), strontium orthosilicate ($SrSiO_4$), strontium orthophosphate ($Sr_3(PO_4)_2$), strontium monohydrogen orthophosphate ($SrHPO_4$), strontium tetraborate ($SrB_4O_7$), strontium fluoride ($SrF_2$), strontium sulfite ($SrSO_2$), strontium oxalate ($SrC_2O_4$), barium sulfate ($BaSO_4$), barium carbonate ($BaCO_3$), barium metasilicate ($BaSiO_3$), barium monohydrogen orthophosphate ($BaHPO_4$), tribarium orthophosphate ($Ba_3(PO_4)_2$), barium hypophosphate ($BaPO_3$), barium pyrophosphate ($Ba_2P_2O_7$), barium fluoride ($BaF_2$), barium sulfite ($BaSO_3$), barium oxalate ($BaC_2O_4$), barium citrate ($Ba_3(C_6H_5O_7)_2$), zinc hydroxide ($Zn(OH)_2$), zinc carbonate ($ZnCO_3$), zinc silicate ($2ZnO\ SiO_2$), zinc metasilicate ($ZnSiO_3$), zinc orthosilicate ($Zn_2SiO_4$), zinc orthophosphate ($Zn_3(PO_4)_2$), zinc pyrophosphate ($Zn_2P_2O_7$), zinc sulfite ($ZnSO_3$), zinc oxalate ($ZnC_2O_4$), zinc citrate ($Zn_3(C_6H_5O_7)_2$), cadmium hydroxide ($Cd(OH)_2$), cadmium carbonate ($CdCO_3$), cadmium metasilicate ($CdSiO_3$), cadmium orthophosphate ($Cd_3(PO_4)_2$), cadmium pyrophosphate ($Cd_2P_2O_7$), cadmium dihydrogen phosphate ($Cd(H_2PO_4)_2$), cadmium sulfite ($CdSO_3$), cadmium oxalate ($CdC_2O_4$), scandium hydroxide ($Sc(OH)_3$), gallium hydroxide ($Ga(OH)_3$), gallium fluoride ($GaF_3$), gallium oxalate ($Ga_2(C_2O_4)_3$), indium hydroxide ($In(OH)_3$), indium fluoride ($InF_3$), lanthanum hydroxide ($La(OH)_3$), lanthanum carbonate ($La_2(CO_3)_3$), lanthanum oxalate ($La_2(C_2O_4)_3$), manganese (II) hydroxide ($Mn(OH)_2$), manganese (III) hydroxide ($Mn(OH)_3$), manganese (II) carbonate ($MnCO_3$), manganese (II) metasilicate ($MnSiO_3$), manganese (II) monohydrogen orthophosphate ($MnHPO_4$), manganese (III) orthophosphate ($MnPO_4$), manganese (III) metaphosphate ($Mn_2(PO_3)_6$), manganese (II) pyrophosphate ($Mn_2P_2O_7$), manganese (II) orthophosphite ($MnHPO_3$), manganese (II) oxalate ($MnC_2O_4$), manganese (II) citrate ($Mn_3(C_6H_5O_7)_2$), iron (II) hydroxide ($Fe(OH)_2$), iron (II) carbonate ($FeCO_3$), iron (II) metasilicate ($FeSiO_3$), iron (II) orthosilicate ($Fe_2SiO_4$), iron (II) orthophosphate ($Fe_3(PO_4)_2$), iron (III) orthophosphate ($FePO_4$), iron (III) orthophosphate ($FePO_4$), iron (III) pyrophosphate ($Fe_4(P_2O_7)_3$), iron (III) hypophosphite ($Fe(H_2PO_2)_3$), iron (II) fluoride ($FeF_2$), iron (III) fluoride ($FeF_3$), iron (II) sulfite ($FeSO_3$), iron (II) oxalate ($FeC_2O_4$), iron (II) citrate ($FeC_6H_6O_7$), iron (III) citrate ($FeC_6H_5O_7$), cobalt (II) hydroxide ($Co(OH)_2$), cobalt (III) hydroxide ($Co(OH)_3$), cobalt (II) carbonate ($CoCO_3$), cobalt (III) carbonate ($Co_2(CO_3)_3$), cobalt (II) orthosilicate ($Co_2SiO_4$), cobalt (II) orthophosphate ($Co_3(PO_4)_2$), cobalt (II) sulfite ($CoSO_3$), cobalt (II) oxalate ($CoC_2O_4$), nickel hydroxide ($Ni(OH)_2$), nickel carbonate ($NiCO_3$), nickel orthophosphate ($Ni_3(PO_4)_2$), nickel sulfite ($NiSO_3$) and nickel oxalate ($NiC_2O_4$). Typically, because the calcium, magnesium and aluminum salts are preferred, the composition includes one or more of the above calcium, magnesium or aluminum salts. The alkali metal and ammonium salts resulting from the reaction typically include one or more of sodium chloride, sodium sulfate, sodium nitrate, potassium chloride, potassium sulfate, potassium nitrate, ammonium chloride, ammonium sulfate or ammonium nitrate.

Some exemplary combinations of the alkali metal and ammonium salts or hydroxides and the Group IIA, Group IIIA, Group IIIB, copper, zinc, cadmium, manganese, iron, cobalt and nickel salts added to the composition include the following: I+V, II+V, III+V, IV+V, I+IV+V, I+VI, II+VI, III+VI, I+VII, II+VII, and III+VII, wherein:

I. sodium hydroxide, sodium carbonate, sodium silicate and/or sodium phosphate;

II. potassium hydroxide, potassium carbonate, potassium silicate and/or potassium phosphate;

III. ammonium hydroxide, ammonium carbonate, ammonium silicate and/or ammonium phosphate;

IV. sodium sulfate, potassium sulfate and/or ammonium sulfate;

V. calcium chloride and/or calcium nitrate;

VI. magnesium chloride, magnesium nitrate and/or magnesium sulfate; and

VII. aluminum chloride, aluminum nitrate and/or aluminum sulfate.

More preferably, the first compound includes ammonium or sodium salts or hydroxide (e.g. ammonium hydroxide or NaOH) and the second compound includes calcium chloride and/or calcium nitrate.

Furthermore, the alkali metal and ammonium salts and hydroxides listed above and other alkali metal and ammonium salts can be combined with the Group IIA, Group IIIA, Group IIIB, copper, zinc, cadmium, manganese, iron, cobalt and nickel salts listed above or any other Group IIA, Group IIIA, Group IIIB, copper, zinc, cadmium, manganese, iron, cobalt and nickel salts in many other combinations in accordance with the invention to provide the desired pH and a Group IIA, Group IIIA, Group IIIB, copper, zinc, cadmium, manganese, iron, cobalt and nickel salt or hydroxide having a low solubility in water.

The order of addition is not critical, but preferred such that the addition of the first compound would not significantly change the latex pH or coagulate it. The at least one first compound can be added before, after, or at the same time as the at least one second compound. If a cationic latex is used, the pH is generally 4-5, so the hydroxide or salts should be added as the second compound to prevent pH increase, which may cause increase in the latex viscosity. To prevent coagulation, incremental amounts of the at least one first compound and the at least one second compound can be made until the entire amount of each is added. Also, the at least one first compound and the at least one second compound could be mixed together and added to the latex.

The alkali metal or ammonium salts or hydroxides in the composition include the salts formed by the reaction between the salts and hydroxides added to the composition as discussed above. Excess alkali metal and ammonium salts and hydroxides added to the composition such as sodium hydroxide are typically also present, particularly if desired to maintain the pH of the composition at a pH of at least about 9. The composition also includes at least one Group IIA, Group IIIA, Group IIIB, copper, zinc, cadmium, manganese, iron, cobalt or nickel salt or hydroxide having low water solubility, e.g., a solubility in water at 20° C. of less than about 0.5 g/100 mL, and exemplary salts and hydroxides are mentioned above. The Group IIA, Group IIIA, Group IIIB, copper, zinc, cadmium, manganese, iron, cobalt and nickel salts added to the composition (e.g. calcium chloride) can also be present in small amounts.

The latex can be dried to provide a nanocomposite film. The drying can be accomplished by any drying method. The film has increased tensile strength, elongation, and heat resistance as compared to a film prepared without the nanoparticles. The film prepared with this nanoparticles are especially unique of achieving significantly improved elongation without reducing the tensile strength. Generally, a polymer film of lower tensile strength has a high elongation, but a stronger polymer has a limited elongation. This nanoparticle modified film prepared by the method of the invention maintains the same or slightly higher tensile strength with significantly improved elongation as compared to a latex that was not modified by the method of the invention.

As shown above, there are a number of possible combinations of alkali metal and ammonium salts and hydroxides and Group IIA, Group IIIA, Group IIIB, copper, zinc, cadmium, manganese, iron, cobalt and nickel salts that can be used in accordance with the invention. Therefore, there is a lot of flexibility in the method of the present invention in selecting salts for the preparation of the compositions. In addition, the amounts of each salt used can affect the resulting compositions.

The present invention will now be further described by the following non-limiting examples. Except where otherwise indicated, percentages are on a per weight basis and solutions are aqueous solutions.

It is understood that upon reading the above description of the present invention, one skilled in the art could make changes and variations therefrom. These changes and variations are included in the spirit and scope of the following appended claims.

EXAMPLE 1

Figure 1:
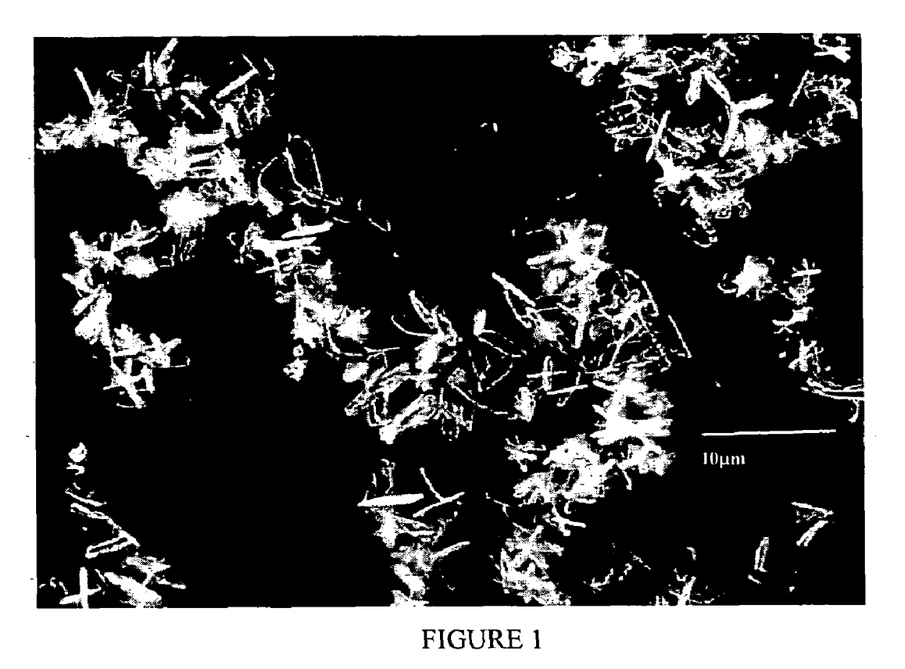
FIG. 1 is a photo-micrograph of fine inorganic crystals generated by mixing equal volume of 30% aqueous $CaCl_2$ and 35% $(NH_4)_2HPO_4$ solutions.

5 g of 30% aqueous $CaCl_2$ (calcium chloride) solution was added into an equal amount of 35% aqueous $(NH_4)_2HPO_4$ (ammonium biphosphate) solution. Fine white precipitate formed immediately upon addition of drops of ammonium biphosphate solution into the calcium chloride solution. Precipitates were diluted with water and optical microscope observation showed the presence of fine platelets of less than 1 micrometer thick and 3-5 micrometer length as shown in FIG. 1.

EXAMPLE 2

Figure 2:
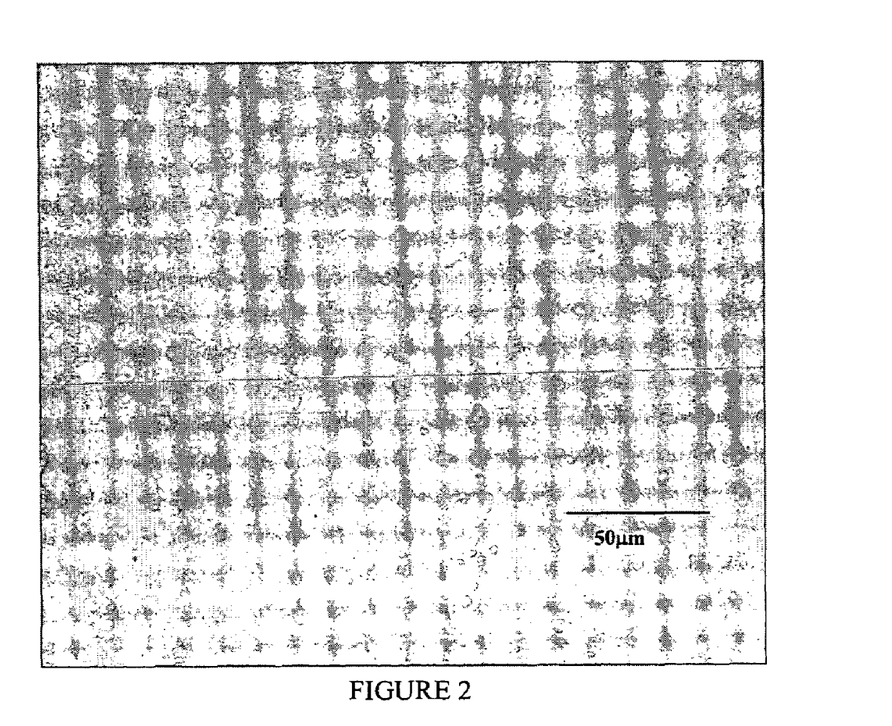
FIG. 2 is a photo-micrograph of a thin cross-section of dried latex film containing approximately 2 wt % of Ca-phosphate nano-crystals.

5 g of 30% aqueous $CaCl_2$ (calcium chloride) solution was added into 100 g of cationic styrene-butadiene latex, BUTONAL® NX1118 from BASF Corporation. The latex remained as a stable dispersion. After mixing, 5 g of 35% aqueous $(NH_4)_2HPO_4$ (ammonium biphosphate) solution was added under agitation. The latex pH remained below 4.5 during and at the end of $(NH_4)_2HPO_4$ addition. This procedure was expected to produce approximately 2 wt % of calcium phosphate (Ca-phosphate) nano-crystals in the latex polymer. A thin latex film of approximately 250 μm was prepared by diluting the latex dispersion from 65% solids to 45% solids with water, spreading the dispersion on a polytetrafluoroethylene plate, and drying at room temperature. Masking tape was applied at four corners of the plate to keep the latex dispersion wetting the plate. After completely drying, the film was cut to expose a thin cross-section, and the cross-section was observed under the optical microscope. The presence of fine nano-crystals was apparent in the entire polymer film as shown in FIG. 2.

EXAMPLE 3

The latex dispersion prepared in Example 2 was dried for one day at room temperature to prepare the latex film as described above, then cured in an oven at 60° C. for 24 hours. As comparison, a latex film was also prepared from BUTONAL® NX1118 latex without addition of calcium chloride or ammonium biphosphate solutions. These latex films were cut to rectangular latex films of approximately 3 mm wide and 25 mm long. The tensile strength of the films with and without Ca-phosphate crystals was determined.

Figure 3A:
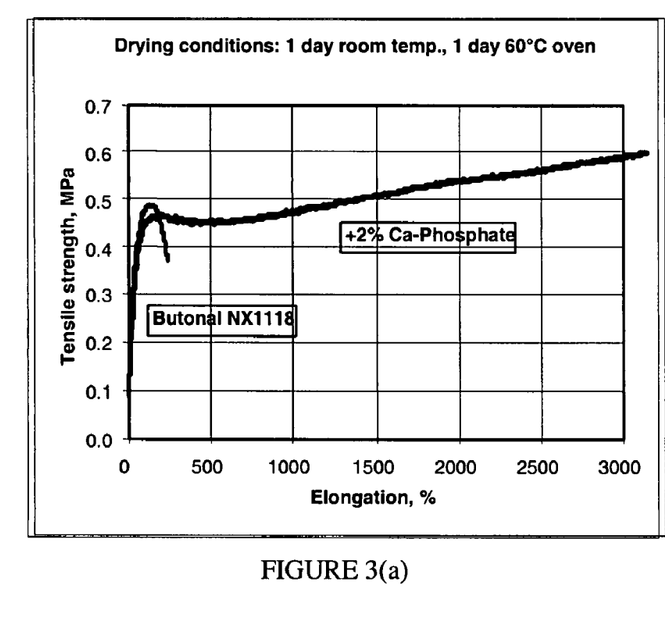
FIG. 3(a) is a graph of the tensile strength vs. elongation of BUTONAL® NX1118 latex film with and without Ca-phosphate nano-crystals. The latex was dried one day in room temperature then placed in an oven of 60° C. for additional 24 hours.

Measured tensile strength of these latex films were shown in FIG. 3a. The BUTONAL® NX1118 latex was not fully dried with the above described condition and the film had only limited strength of slightly below 0.5 MPa peak strength and broken at about 250% elongation. The film developed a thin filament (necking) under elongation and broke from that weak point. In contrast, the 2% Ca-phosphate nano-crystal modified latex film did not develop the necking and maintained its original dimension during elongation even at above 3,000% elongation and the tensile strength reached nearly 0.6 MPa at this elongation. The latex film did not break at 3,200% elongation, which was the limit of the instrument used.

Figure 3B:
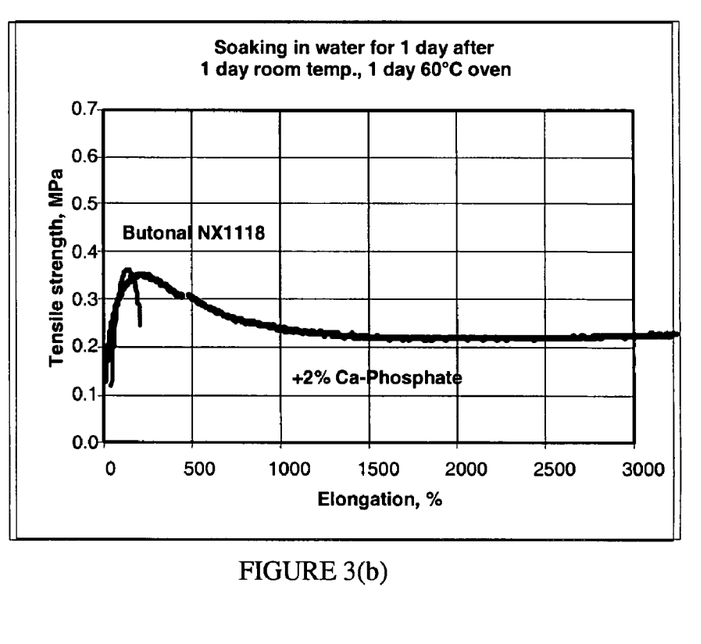
FIG. 3(b) is a graph of the tensile strength of the same films after being immersed in water for 24 hours.

The above-described latex films were soaked in water for one day, and the tensile strength measured. Excess water was absorbed with paper towel prior of the measurement. The tensile strength of the BUTONAL® NX1118 latex film dropped to below 0.4 MPa peak strength after immersing in water for 24 hours, and it broke at about 200% elongation (FIG. 3b). The Ca-phosphate modified latex film also lost peak strength, but maintained 0.2 MPa strength above 1,000% elongation and did not break even at 3,200% elongation.

EXAMPLE 4

Figure 4:
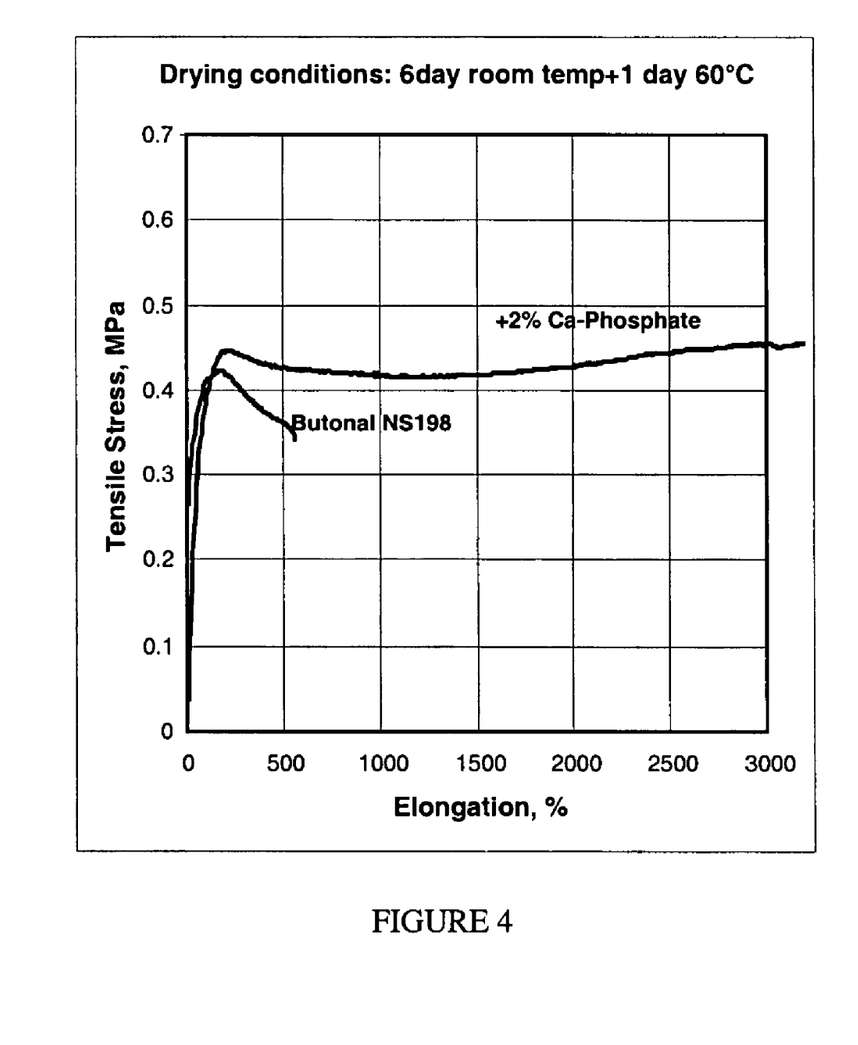
FIG. 4 is a graph of tensile strength vs. elongation similar to FIG. 3, but BUTONAL® NS198 latex was used instead of the BUTONAL® NX1118 latex.
Figure 5:
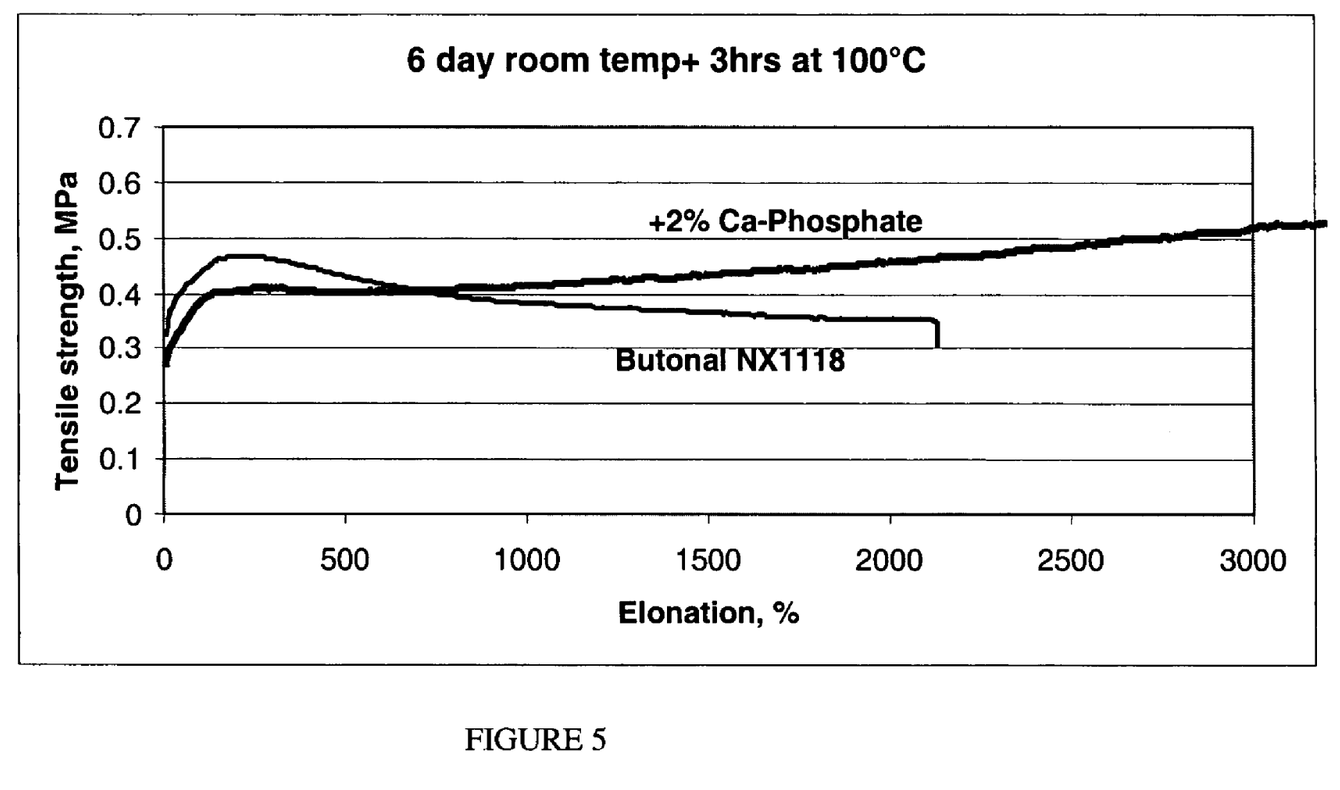
FIG. 5 is a graph of tensile strength vs elongation for the BUTONAL® NX1118 latex film with and without Ca-phosphate nano-crystals. The latex films were heat treated at 100° C. for 3 hours after drying in ambient temperature for 6 days.

5 g of 30% aqueous $CaCl_2$ (calcium chloride) solution was added into 100 g of cationic styrene-butadiene latex, BUTONAL® NS198 from BASF Corporation. The latex dispersion was dried for 6 days at room temperature and cured in an oven at 60° C. for 24 hours. As comparison, the latex film was also prepared with BUTONAL® NS198 latex without calcium chloride or ammonium biphosphate solutions. The tensile strength of these films was determined as in Example 3 and results are shown in FIG. 4. The latex film of the BUTONAL® NS198 latex showed slightly above 0.4 MPa maximum tensile strength and the film broke at slightly above 500% elongation. In contrast, the latex film with Ca-phosphate nano-crystals did not break even at 3000% elongation at the maximum tensile strength of 0.45 MPa.

EXAMPLE 5

The latex film of BUTONAL® NX1118 modified with Ca-phosphate nano-crystals was prepared as in Example 3, but it was dried for 6 days at room temperature and then placed in an oven at 100° C. for 3 hours. The latex film showed only slight discoloration to light brown after 3 hours of heat aging. In comparison, the latex film of the BUTONAL® NX1118 latex became brown after the same heat treatment. The latex film modified with Ca-phosphate nano-crystals maintained above 3000% elongation after the heat treatment. In contrast, the unmodified BUTONAL® NX1118 latex film was broken at slightly above 2100% elongation.

EXAMPLE 6

Ca-phosphate nano-crystal modified and unmodified BUTONAL® NX1118 latex films were prepared as in Example 5, but after drying 6 days at room temperature, the films were placed in a forced airflow oven at 160° C. for 20 minutes. The unmodified BUTONAL® NX1118 latex film discolored and had a brown color. The Ca-phosphate nano-crystal modified film showed only slight discoloration. The latex films were also heat aged for 40 minutes at the same condition. The unmodified latex film became dark brown after 40 minutes of heat aging, but the Ca-phosphate nano-crystal modified one showed less discoloration.

Figure 6A:
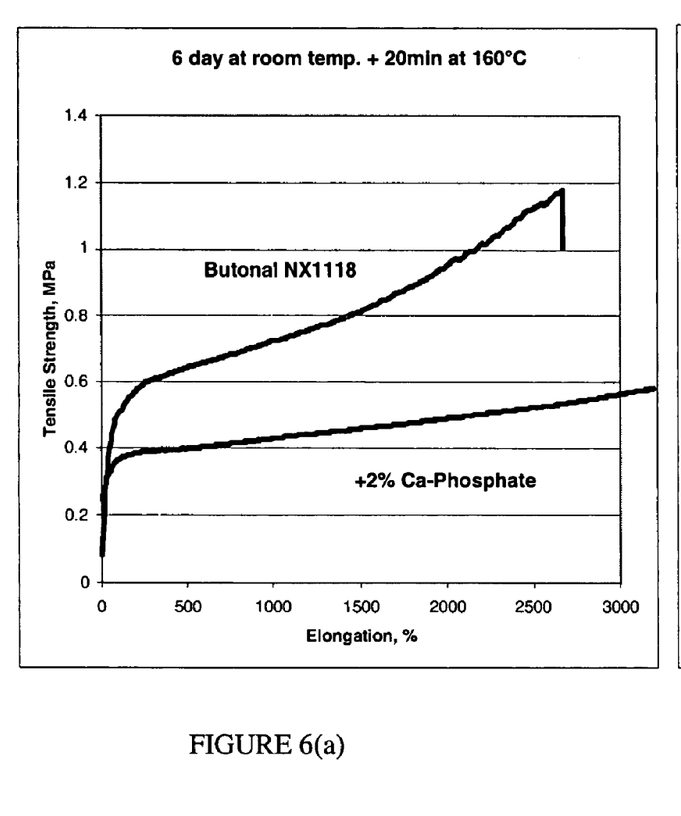
Figure 6B:
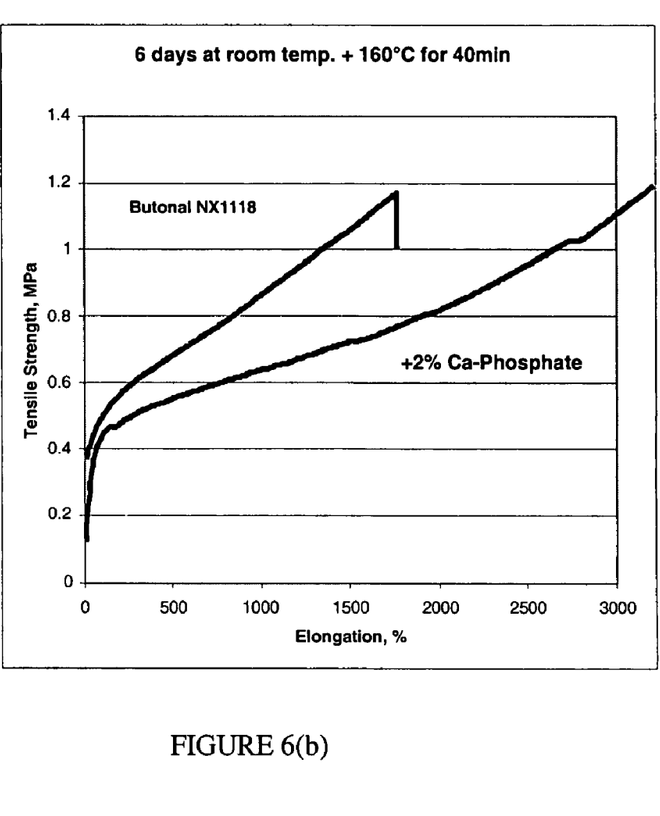

The tensile strength of the latex film and the Ca-phosphate nano-crystal modified film were determined after 20 minutes and 40 minutes heat aging at 160° C. (FIGS. 6a and b). The Ca-phosphate modified films maintained above 3000% elongation even after these severe heat agings.

EXAMPLE 7

Figure 7:
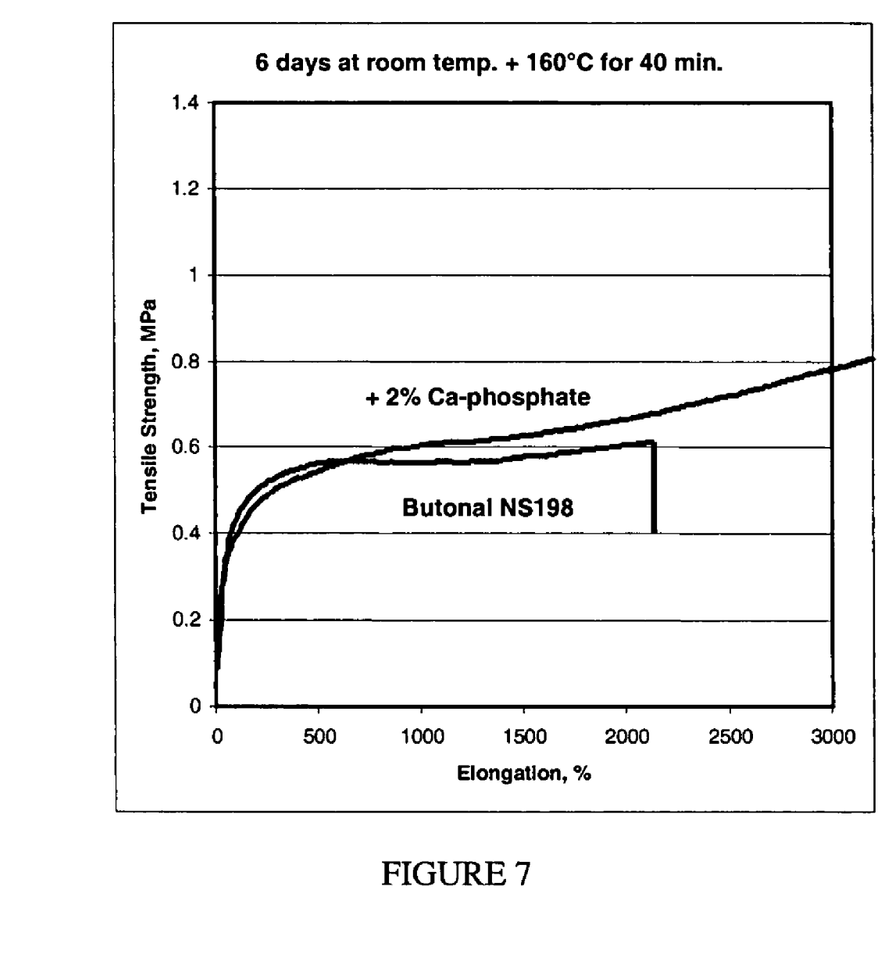
FIG. 7 is a graph of tensile strength vs. elongation with BUTONAL® NS198 latex and Ca-phosphate nano-crystal modified latex.

BUTONAL® NS198 latex modified with Ca-phosphate nano-crystals was prepared as in Example 4. This latex dispersion was dried for 6 days at room temperature and heat aged for 40 minutes in a forced airflow oven at 160° C. A latex film of BUTONAL®D NS198 latex was also prepared and heat aged at the same condition. The BUTONAL® NS198 latex film became dark brown after 40 minutes of heat aging, but the Ca-phosphate nano-crystal modified film was lighter color than the unmodified film. The tensile strength of both latex films was determined and results are shown in FIG. 7. The unmodified film broke at slightly above 2100% elongation, but the Ca-phosphate nano-crystal modified film did not break even at 3000% elongation.

What is claimed is:

1. A method of forming a composition comprising adding at least one first compound in an amount from greater than 0 to about 4 parts by weight of the composition that is at least one of an alkali metal salt, an ammonium salt, an alkali metal hydroxide, or an ammonium hydroxide and at least one second compound in an amount from greater than 0 to about 2 parts by weight of the composition that is at least one of a Group IIA salt, a Group IIIA salt, a Group IIIB salt, a copper salt, a zinc salt, a cadmium salt, a manganese salt, an iron salt, a cobalt salt, or a nickel salt to a latex, wherein the salts of the at least one second compound are selected from the group consisting of chlorides, sulfates, nitrates, and combinations thereof, and the latex remains a stable dispersion.

2. The method of claim 1 further comprising drying the composition.

3. The method of claim 1, wherein the at least one first compound is added before the at least one second compound.

4. The method of claim 1, wherein the at least one second compound is added before the at least one first compound.

5. The method of claim 1, wherein the salts of the at least one first compound are selected from the group consisting of sulfates, carbonates, silicates, phosphates, phosphites, borates, fluorides, sulfites, oxalates, citrates, and combinations thereof.

6. The method of claim 1, wherein the alkali metal of the at least one first compound is at least one of sodium or potassium.

7. The method of claim 1, wherein the at least one first compound is selected from the group consisting of sodium hydroxide (NaOH), sodium sulfate ($Na_2SO_4$), sodium bisulfate ($NaHSO_4$), sodium carbonate ($Na_2CO_3$), sodium bicarbonate ($NaHCO_3$), sodium metasilicate ($Na_2SiO_3$), sodium disilicate ($Na_2Si_2O_5$), sodium orthosilicate ($Na_4SiO_4$), sodium orthophosphate ($Na_3PO_4$), disodium hydrogen phosphate ($Na_2HPO_4$), sodium dihydrogen phosphate ($NaH_2PO_4$), hexasodium metaphosphate (($NaPO_3)_6$), trisodium metaphosphate (($NaPO_3)_3$), sodium triphosphate ($Na_5P_3O_{10}$), sodium hypophosphite ($NaH_2PO_2$), sodium dihydrogen orthophosphite ($NaH_2PO_3$), sodium metaborate ($NaBO_2$), sodium sulfite ($Na_2SO_3$), sodium citrate ($Na_3C_6H_5O_7$), potassium hydroxide (KOH), potassium sulfate ($K_2SO_4$), potassium bisulfate ($KHSO_4$), potassium carbonate ($K_2CO_3$), potassium bicarbonate ($KHCO_3$), potassium sodium carbonate ($KNaCO_2$), potassium metasilicate ($K_2SiO_3$), potassium tetrasilicate ($K_2Si_4O_9$), potassium orthophosphate ($K_3PO_4$), dipotassium hydrogen phosphate ($K_2HPO_4$), potassium dihydrogen phosphate ($KH_2PO_4$), hexapotassium metaphosphate (($KPO_3)_6$), tetrapotassium metaphosphate (($KPO_3)_4$), potassium pyrophosphate ($K_4P_2O_7$), potassium subphosphate ($K_2PO_3$), potassium hypophosphite ($KH_2PO_2$), potassium dihydrogen orthophosphite ($KH_2PO_3$), potassium metaborate ($KBO_2$), potassium tetraborate ($K_2B_4O_7$), potassium fluoride (KF), potassium sulfite ($K_2SO_3$), potassium hydrogen sulfite ($KHSO_3$), potassium citrate ($K_3C_6H_5O_7$), monobasic potassium citrate ($KH_2C_6H_5O_7$), ammonium hydroxide ($NH_4OH$), ammonium sulfate (($NH_4)_2SO_4$), ammonium bisulfate ($NH_4HSO_4$), ammonium carbonate (($NH_4)_2CO_3$), ammonium bicarbonate ($NH_4HCO_3$), ammonium orthophosphate (($NH_4)_3PO_4$), diammonium hydrogen phosphate (($NH_4)_2HPO_4$), ammonium dihydrogen phosphate ($NH_4H_2PO_4$), ammonium sodium phosphate ($NaNH_4HPO_4$), ammonium hypophosphite ($NH_4H_2PO_2$), ammonium dihydrogen orthophosphite ($NH_4H_2PO_3$), ammonium fluoride ($NH_4F$), ammonium sulfite (($NH_4)_2SO_3$), ammonium bisulfite ($NH_4HSO_3$), ammonium binoxalate ($NH_4HC_2O_4$), diammonium citrate (($NH_4)_2HC_6H_5O_7$), triammonium citrate (($NH_4)_3C_6H_5O_7$), and combinations thereof.

8. The method of claim 1, wherein the at least one second compound is selected from the group consisting of calcium chloride ($CaCl_2$), calcium nitrate ($Ca(NO_3)_2$), magnesium chloride ($MgCl_2$), magnesium nitrate ($Mg(NO_3)_2$), magnesium sulfate ($MgSO_4$), aluminum chloride ($AlCl_3$), aluminum nitrate ($Al(NO_3)_3$), aluminum sulfate ($Al_2(SO_4)_3$), beryllium chloride ($BeCl_2$), beryllium nitrate ($Be(NO_3)_2$), beryllium sulfate ($BeSO_4$), copper (II) chloride ($CuCl_2$), copper (II) nitrate ($Cu(NO_3)_2$), copper (II) sulfate ($CuSO_4$), strontium chloride ($SrCl_2$), strontium nitrate ($Sr(NO_3)_2$), barium chloride ($BaCl_2$), barium nitrate ($Ba(NO_3)_2$), zinc chloride ($ZnCl_2$), zinc nitrate ($Zn(NO_3)_2$), zinc sulfate ($ZnSO_4$), cadmium chloride ($CdCl_2$), cadmium nitrate ($Cd(NO_3)_2$), cadmium sulfate ($CdSO_4$), scandium chloride ($ScCl_3$), scandium nitrate ($Sc(NO_3)_3$), scandium sulfate ($Sc_2(SO_4)_3$), gallium chloride ($GaCl_3$), gallium nitrate ($Ga(NO_3)_3$), gallium sulfate ($Ga_2(SO_4)_3$), indium chloride ($InCl_3$), indium nitrate ($In(NO_3)_3$), indium sulfate ($In_2(SO_4)_3$), lanthanum chloride ($LaCl_3$), lanthanum nitrate ($La(NO_3)_3$), manganese (II) chloride ($MnCl_2$), manganese (II) nitrate ($Mn(NO_3)_2$), manganese (II) sulfate ($MnSO_4$), iron (II) chloride ($FeCl_2$), iron (II) nitrate ($Fe(NO_3)_2$), iron (II) sulfate ($FeSO_4$), iron (III) chloride ($FeCl_3$), iron (III) nitrate ($Fe(NO_3)_3$), iron (III) sulfate ($Fe_2(SO_4)_3$), cobalt (II) chloride ($CoCl_2$), cobalt (II) nitrate ($Co(NO_3)_2$), cobalt (II) sulfate ($CoSO_4$), cobalt (III) chloride ($COCl_3$), nickel chloride ($NiCl_2$), nickel nitrate ($Ni(NO_3)_2$), nickel sulfate ($NiSO_4$), and combinations thereof.

9. The method of claim 1, wherein combinations of the at least one first compound and the at least one second compound are selected from the group consisting of I+V, II+V, III+V, IV+V, I+IV+V, I+VI, II+VI, III+VI, I+VII, II+VII, and III+VII, wherein

- I) at least one of sodium hydroxide, sodium carbonate, sodium silicate, and/or sodium phosphate;
- II) at least one of potassium hydroxide, potassium carbonate, potassium silicate, and/or potassium phosphate;
- III) at least one of ammonium hydroxide, ammonium carbonate, ammonium silicate, and/or ammonium phosphate;
- IV) at least one of sodium sulfate, potassium sulfate, and/or ammonium sulfate;
- V) at least one of calcium chloride and/or calcium nitrate;
- VI) at least one of magnesium chloride, magnesium nitrate, and/or magnesium sulfate; and
- VII) at least one of aluminum chloride, aluminum nitrate, and/or aluminum sulfate.

10. The method of claim 1, wherein the at least one first compound is at least one of a sodium salt or sodium hydroxide, and the at least one second compound is at least one of calcium chloride and/or calcium nitrate.

\* \* \* \* \*